US012572975B2

(12) United States Patent
Isgar

(10) Patent No.: US 12,572,975 B2
(45) Date of Patent: Mar. 10, 2026

(54) PRODUCT PLACEMENT VERIFICATION SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 438 days.

(21) Appl. No.: 17/233,759

(22) Filed: Apr. 19, 2021

(65) Prior Publication Data

US 2021/0334884 A1     Oct. 28, 2021

Related U.S. Application Data

(63) Continuation-in-part of application No. 17/201,829, filed on Mar. 15, 2021, now abandoned.

(60) Provisional application No. 63/014,953, filed on Apr. 24, 2020.

(51) Int. Cl.
| | |
|---|---|
| *G06Q 30/00* | (2023.01) |
| *G06Q 30/018* | (2023.01) |
| *G06Q 30/0601* | (2023.01) |

(52) U.S. Cl.
CPC ....... *G06Q 30/0639* (2013.01); *G06Q 30/018* (2013.01)

(58) Field of Classification Search
USPC ...................................................... 705/27.2
See application file for complete search history.

(56) References Cited

U.S. PATENT DOCUMENTS

| | | | |
|---|---|---|---|
| 7,685,023 B1 | 3/2010 | Abraham et al. | |
| 7,956,769 B1 | 6/2011 | Pearl | |
| 9,838,843 B1 | 12/2017 | Bajaj et al. | |
| 9,984,408 B1 | 5/2018 | Wong et al. | |
| 10,902,439 B2 * | 1/2021 | Holman | .............. G06Q 30/0201 |
| 11,145,016 B1 | 10/2021 | Brophy | |
| 11,270,328 B1 * | 3/2022 | Cohen | .................. H04W 4/029 |
| 2001/0044751 A1 | 11/2001 | Pugliese et al. | |
| 2006/0259369 A1 | 11/2006 | Bongrazio et al. | |
| 2009/0287587 A1 | 11/2009 | Bloebaum et al. | |
| 2010/0241525 A1 | 9/2010 | Aguera et al. | |
| 2011/0246064 A1 | 10/2011 | Nicholson | |
| 2012/0233003 A1 | 9/2012 | Calman et al. | |
| 2013/0339255 A1 | 12/2013 | Talbird et al. | |
| 2014/0214595 A1 | 7/2014 | Argue et al. | |
| 2014/0279277 A1 | 9/2014 | Pei | |

(Continued)

OTHER PUBLICATIONS

Whitla, P., Crowdsourcing and its application in marketing activities, 2009, Contemporary Management Research, 5(1), pp. 15-28. (Year: 2009).*

*Primary Examiner* — Kelly S. Campen
*Assistant Examiner* — Brittany E Bargeon
(74) *Attorney, Agent, or Firm* — Schmeiser, Olsen & Watts LLP

(57) ABSTRACT

Described is a product placement verification system. The system includes a server having a memory storing store information, including at least one shelving video or photography of travel up and down aisles of a store recorded by a camera system. The system also includes a user computing device coupled to the server. The system allows a user to virtually navigate aisles in a store through the user computing device accessing the system and the stored shelving video or photography. The user may select items and the system determine location of the selected item within the store, including shelf height and slot width. The server may be programmed to provide a product placement report to the user computing device.

4 Claims, 19 Drawing Sheets

(56) References Cited

U.S. PATENT DOCUMENTS

| | | |
|---|---|---|
| 2015/0317586 A1 | 11/2015 | Kassman |
| 2015/0339625 A1 | 11/2015 | Agasti et al. |
| 2015/0369618 A1 | 12/2015 | Barnard et al. |
| 2016/0150215 A1* | 5/2016 | Chen .................... H04N 13/239 348/47 |
| 2016/0260145 A1 | 9/2016 | High et al. |
| 2016/0357768 A1 | 12/2016 | Strong et al. |
| 2017/0236177 A1 | 8/2017 | Sebastian et al. |
| 2017/0351975 A1 | 12/2017 | Webb |
| 2018/0057262 A1 | 3/2018 | Mitsuyu et al. |
| 2018/0374075 A1* | 12/2018 | Tian ........................ H04W 4/23 |
| 2019/0114583 A1 | 4/2019 | Ripert et al. |
| 2019/0149725 A1* | 5/2019 | Adato ...................... H04N 1/00 348/158 |
| 2019/0347704 A1* | 11/2019 | Stamboni ........... G06Q 30/0639 |
| 2019/0392506 A1 | 12/2019 | Bogolea et al. |
| 2020/0182634 A1 | 6/2020 | Karceski |
| 2020/0302510 A1 | 9/2020 | Chachek et al. |
| 2020/0410623 A1 | 12/2020 | Vahabzadeh |
| 2021/0097484 A1* | 4/2021 | Ramos .................. G06V 20/52 |
| 2021/0201263 A1* | 7/2021 | Glaser ............... G06Q 30/0641 |

* cited by examiner

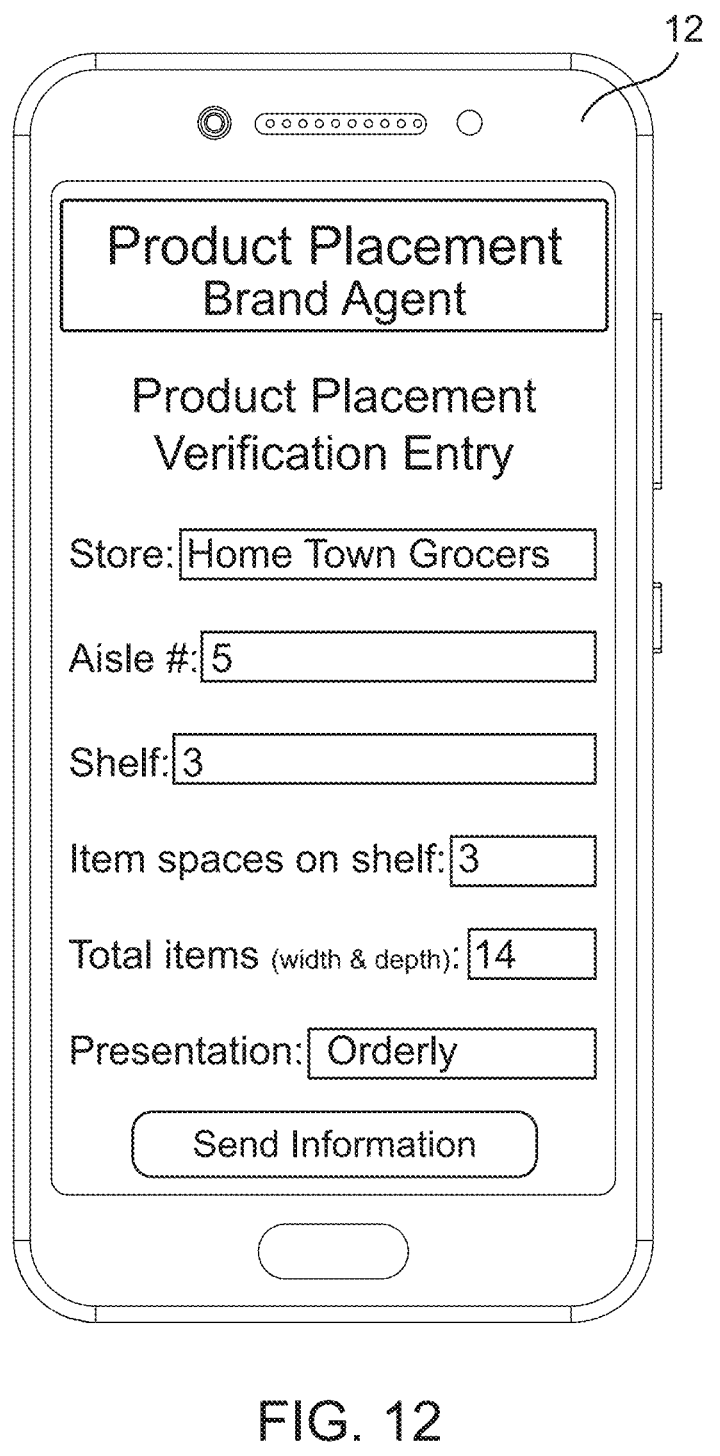

Product Placement
Brand Agent

Product Placement
Verification Entry

Store: Home Town Grocers

Aisle #: 5

Shelf: 3

Item spaces on shelf: 3

Total items (width & depth): 14

Presentation: Orderly

Send Information

FIG. 12

DAILY AUTOMATED STORE SURVEY SYSTEM

DAILY AUTOMATED STORE SURVEY SYSTEM

ABC Food Company: Product Placement Dashboard

Daily Aisle Report

Store: City Grocer

Aisle: 10

Shelf Height: 3rd Shelf

ZOOM    −    +

DAILY AUTOMATED STORE SURVEY SYSTEM

ABC Food Company: Product Placement Dashboard

Daily Aisle Report

Store: City Grocer

Aisle: 10

Slot Width: 2.5 ft.

ZOOM    −    +

PRODUCT PLACEMENT VERIFICATION SYSTEM

CROSS REFERENCE TO RELATED APPLICATION[S]

This application is a continuation-in-part of U.S. patent application Ser. No. 17/201,829, filed Mar. 15, 2021, which claims priority to U.S. Provisional Patent Application Ser. No. 63/014,953, filed Apr. 24, 2020, the disclosures of which are hereby incorporated entirely herein by reference.

BACKGROUND OF THE INVENTION

Technical Field

This invention generally relates to a product placement verification system, and more specifically to a product placement verification system for obtaining and providing current video/images and/or data to a company to visually verify product placement and generation of product placement reports.

State of the Art

Online shopping is becoming more commonplace for all types of products, including groceries and other personal care and cleaning items, particularly, when a consumer does not or is not able to actually go to his or her favorite store. Further, services exist where individuals are employed to travel to a store with a list of items for a particular customer from a particular store or multiple stores for pick-up, purchase and delivery to a home of the customer. While online shopping is much more commonplace, services for product placement are not provided in a digital/online manner. Rather, product placement services are still handled by in person visits to stores to verify and determine the sales and other data related to product sales based on product placement within a store. There is not a system that exists that provides product placement services.

Accordingly, what is needed is an improved remote digital/virtual product placement verification system providing remote product placement services that is similar to in-person product placement services.

SUMMARY OF THE INVENTION

An embodiment includes a product placement verification system comprising: a server having a memory for storing store information and product information; a user computing device coupled to the server; and a business computing device coupled to the server, wherein the server is programmed to receive and process a signal from the business computing device including a request for a product placement verification at a particular store; generate and send a product placement verification request to the user computing device including information received from the request received from the business computing device; receive and process a signal from the user computing device including acceptance of the product placement verification request; receive a signal from the user computing device that the user computing device is within a store corresponding to the product placement verification request and send for display on the user computing device a user interface for taking and sending an image and/or video of a location of product corresponding to the product placement verification request; receive a signal from the user computing device including the image and/or video of the location of the product and store the image and/or video in the memory of the server; and send for display on the business computing device the image and/or video of the location of the product. The server may also send for display on the business computing device a report corresponding to the product within the store corresponding to the product placement verification request.

An embodiment includes product placement verification system comprising: a server having a memory for storing store information, comprising a shelving video or photography of travel up and down aisles of a store recorded by a camera system; and a business computing device coupled to the server, wherein the server is programmed to: receive and process a signal from the camera system containing the recorded shelving video or photography and store the shelving video or photography in the memory of the server; receive and process a signal from the business computing device that the business computing device has accessed the system and requested product placement services; send, for display on the business computing device, a product placement interface including the shelving video or photography with navigation controls; receive navigation input from the navigation controls on the shopping interface displayed on the business computing device and adjust the display in response to the navigation input from the navigation controls; receive an item selection input from the business computing device to view a location of each selected item on a shelf within the store; send, for display on the business computing device, the product placement interface including shelf height information and slot width measurements for visual verification of the product placement services requested by the user; receive a signal from the business computing device including a report request; and send, for display on the business computing device, a report interface including product placement data.

An embodiment includes a product location system comprising: a server having a memory for storing store information, comprising a shelving video or photography of travel up and down aisles of a store recorded by a camera system; and a user computing device coupled to the server, wherein the server is programmed to: receive and process a signal from the camera system containing the recorded shelving video or photography and store the shelving video or photography in the memory of the server; generate and store in memory a map of the store with product locations in the aisles of the map; and receive a signal from the user computing device comprising a request for the map and sending the map for display and interaction to the user computing device. The map may display a location of a particular product selected with the user computing device. The map may further display a specific shelf height and location for the product and an image of the product in that specific shelf height and location for the store the map corresponds with.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 12 is a user interface operating on a user computing device for interaction with a product placement verification system according to an embodiment;

DETAILED DESCRIPTION OF EMBODIMENTS OF THE INVENTION

Embodiments of the present invention relate to remote digital/virtual product placement verification system providing remote product placement services that is similar to in-person product placement services. Modern technology utilized by the system operates as a shopping system. The system may include the use of a mobile application operating on a user computing device and on a shopper computing device that may be a mobile computing device like a smartphone, a tablet, a wearable, and the like; and/or the system may operate on any type of computing device, including a computer or the like.

Figure 1:
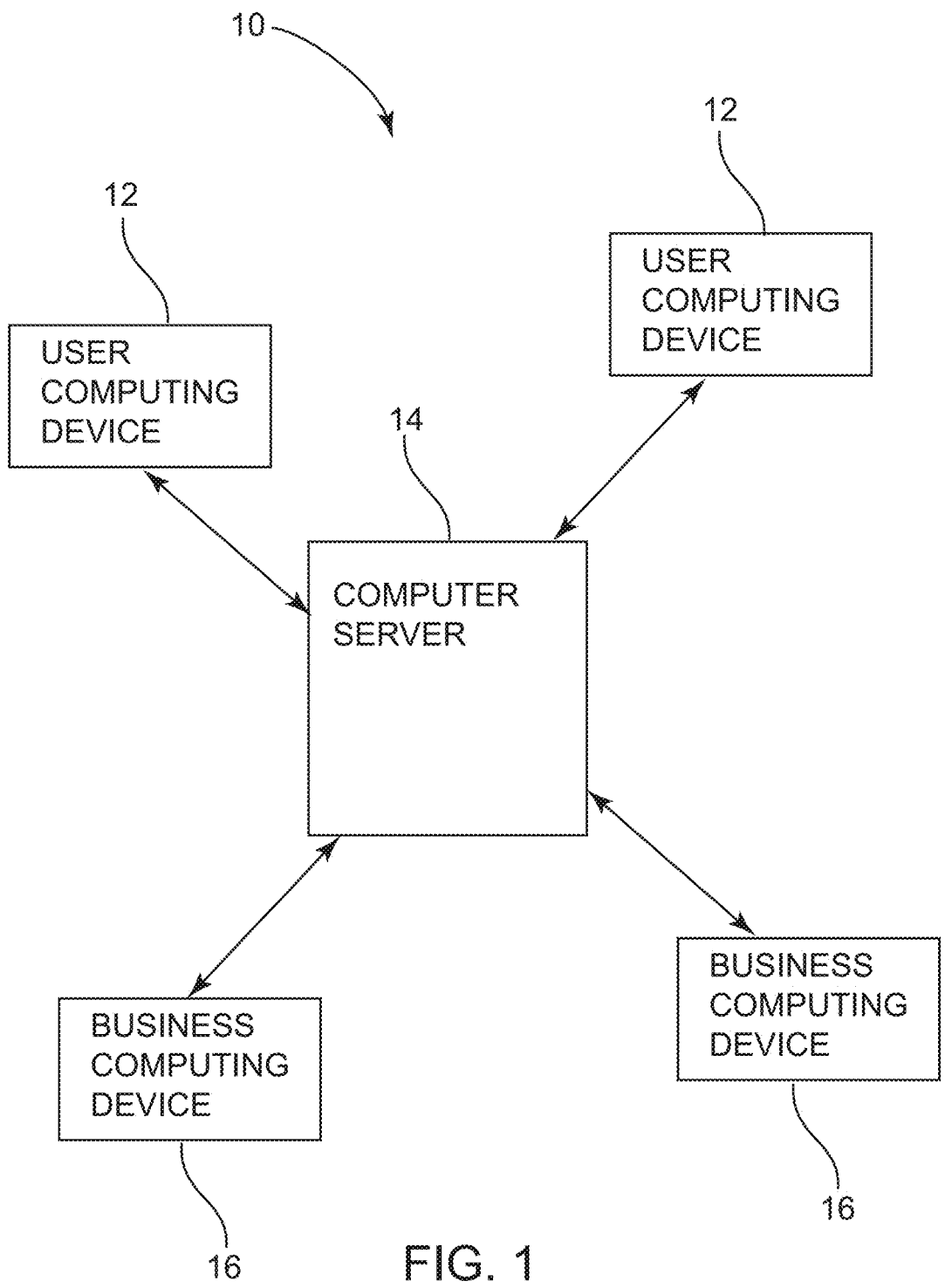
FIG. 1 is a diagrammatic view of a product placement verification system according to an embodiment.

FIG. 1 depicts an embodiment of a shopping system 10. The system 10 may include user computing devices 12, business computing devices 16 and a computer server 14, wherein each user computing device 12 and each business computing device 16 is coupled to the computer server 14. This coupling may be a network connection, such as a wireless connection through an Internet connection, a Wi-Fi connection, a Bluetooth connection or the like, wherein the user computing devices 12 and business computing devices 16 may communicate with and receive communication from the server 14. The user computing device 12 and the business computing device 16 may each be any of a desktop computer, a laptop, a tablet, a smartphone, a wearable device and the like. The server 14, in some embodiments, may be a computer server or a cloud-based infrastructure architecture.

The server 14 may include a memory storing store information and product information. The store information may include information for a plurality of stores, wherein the information for each store may include, without limitation, one or more of a store name, a store number, an address of the store, a map of the store, product locations within the store, and the like. The product information may include, without limitation, a plurality of products sold in the store, location of the products within the store and the like.

A user computing device 12 and a business computing device 16 may be coupled to the server 14, and the server 14 may be programmed to receive and process a signal from the business computing device 16 including a request for a product placement verification at a particular store; generate and send a product placement verification request to the user computing device 12 including information received from the request received from the business computing device 16; receive and process a signal from the user computing device 12 including acceptance of the product placement verification request; receive a signal from the user computing device 12 that the user computing device 12 is within a store corresponding to the product placement verification request and send for display on the user computing device 12 a user interface for taking and sending an image and/or video of a location of product corresponding to the product placement verification request; receive a signal from the user computing device 12 including the image and/or video of the location of the product and store the image and/or video in the memory of the server 14; and send for display on the business computing device 16 the image and/or video of the location of the product. The server 14 may also send for display on the business computing device 16 a report corresponding to the product within the store corresponding to the product placement verification request.

Figure 2:
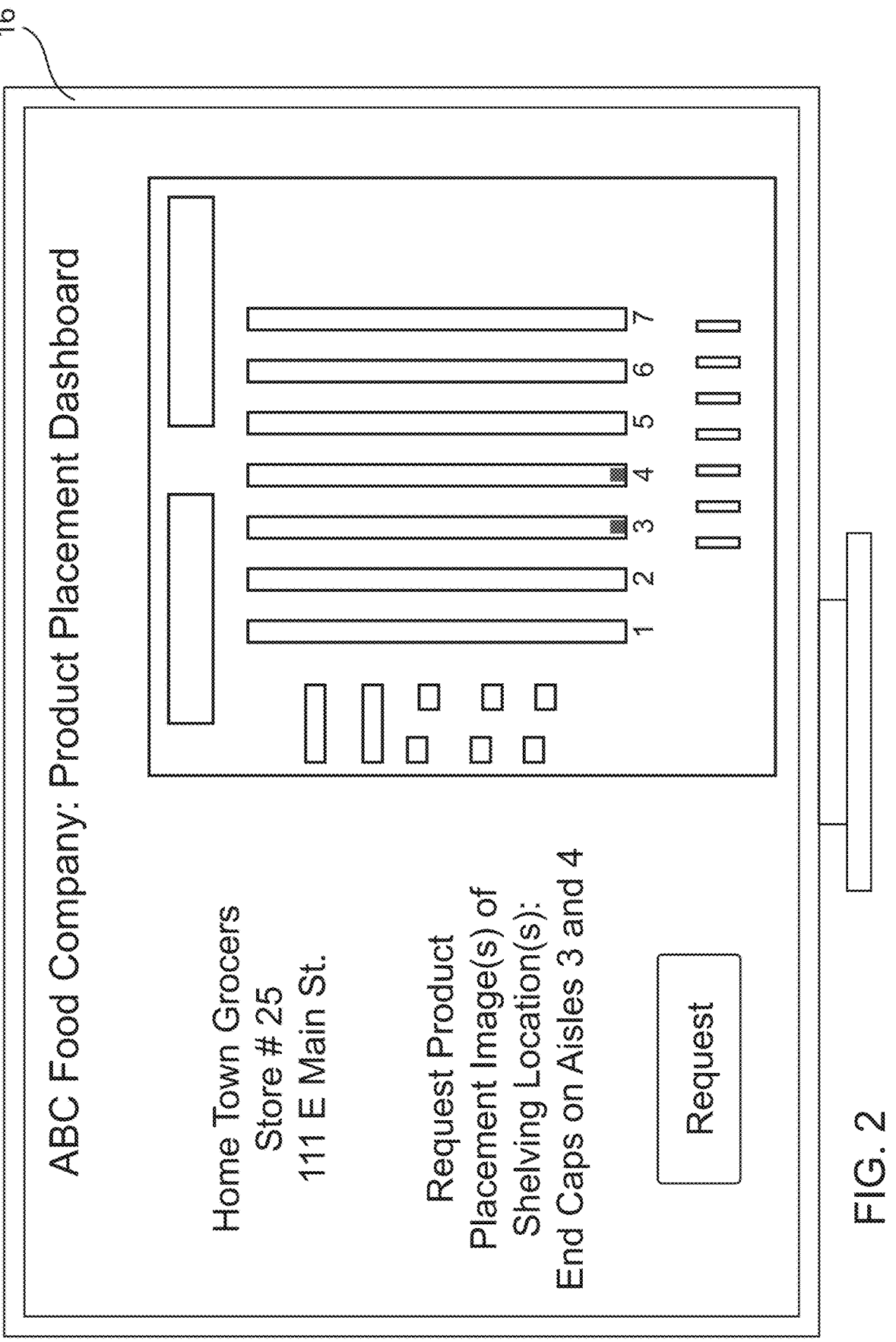
FIG. 2 is a front view of a business computing device operating as part of a product placement verification system for requesting product placement verification according to an embodiment.

Referring further to the drawings, FIGS. 2-13 depict embodiments of the product placement verification system 10 in operation. As shown in FIG. 2, the business computing device 16 may provide a user interface for requesting product placement verification. In this embodiment, the business computing device 16 may include a request for verifying various end caps on aisles that correspond to contracts the company operating the business computing device 16 has with a selected store. The request may include the store name, the address, and the end cap or end caps that the company wishes to have product placement verification performed. In embodiments, the server 14 may send for display on the business computing device 16 a map in a graphical interface allowing the operator of the business computing device 16 to interact with the map and select the end caps that the company wishes to analyze or verify, as depicted by the red indicators on the map. In embodiments, the business computing device 16 may receive text input and the server 14 may operate to display the text input in a graphical form in the map, such as entry of end cap locations and the map then depicts those locations with indicators, such as the red indicators shown in FIG. 2. Once the company operating the business computing device 16 is satisfied with the request content, the operator may select the request button to send the request to the server 14.

Figure 3A:
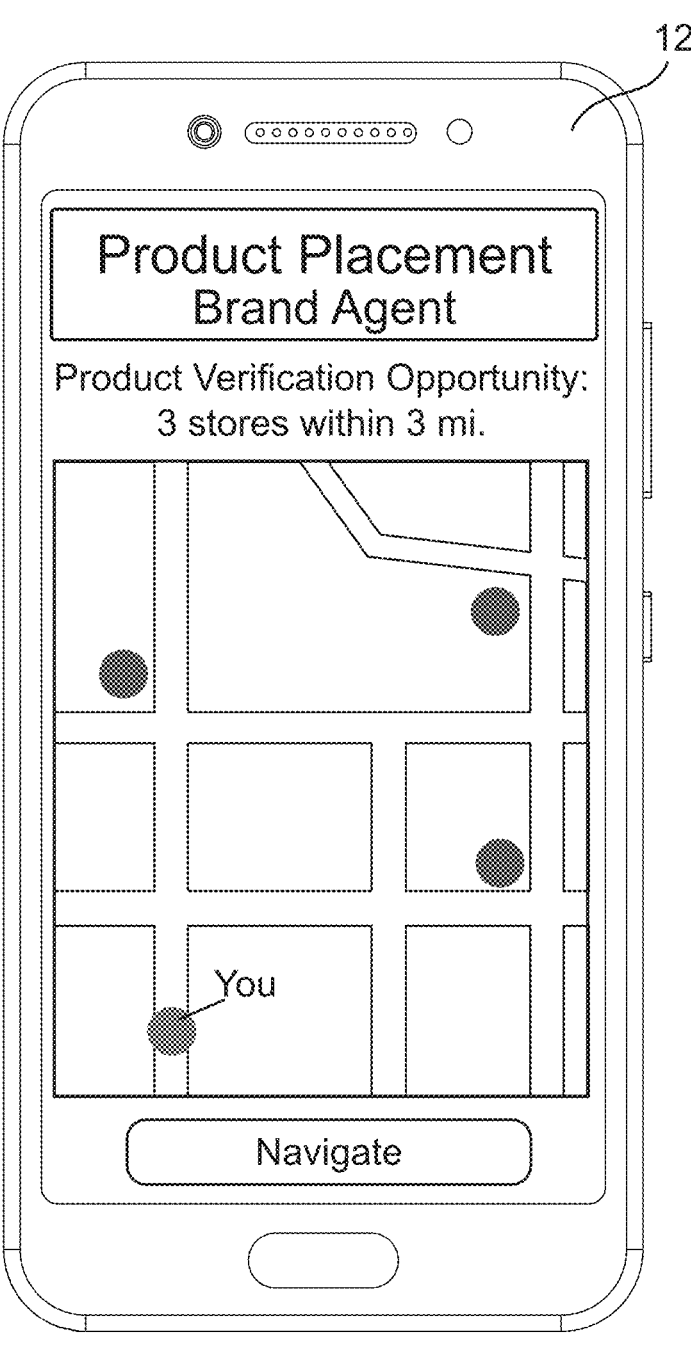
FIG. 3 is a user interface operating on a user computing device for interaction with a product placement verification system according to an embodiment.
Figure 3B:
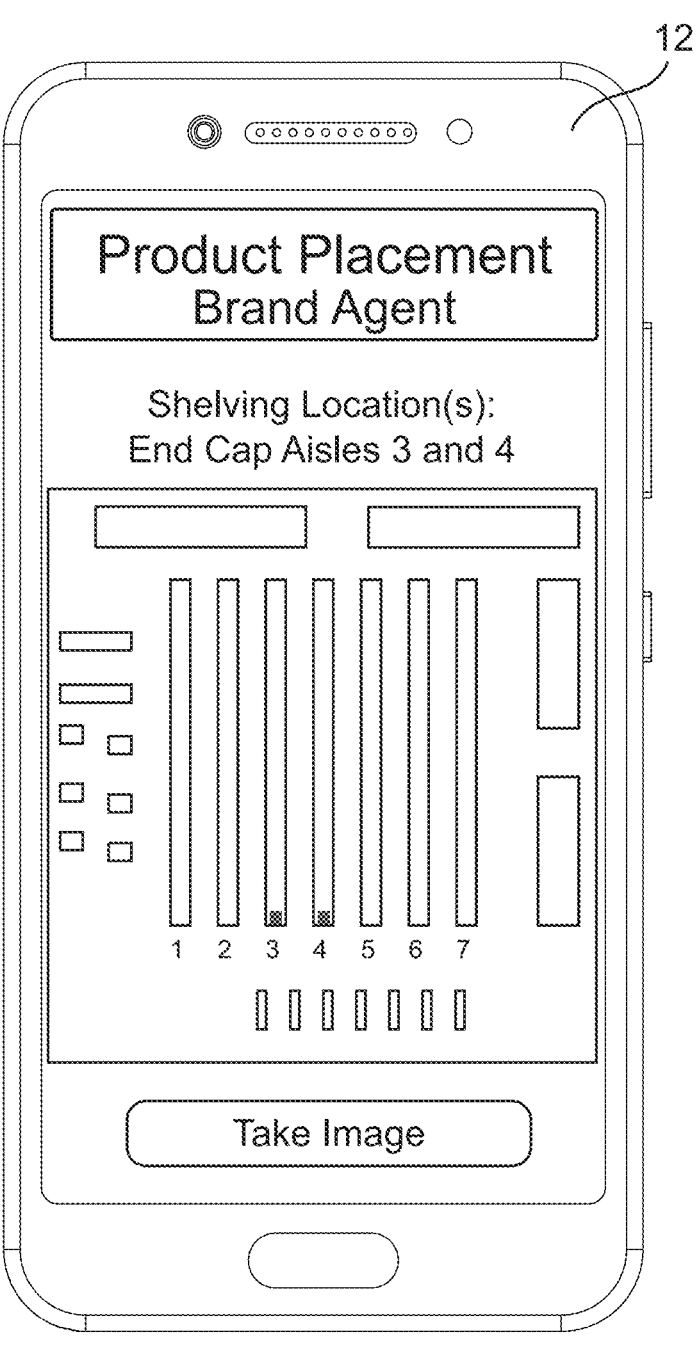

Once the server 14 receives the request from the business computing device 16, the server 14 may be programmed to process the request and generate a product placement verification request that includes the content and information in the request from the business computing device 16. The server 14 may be programmed to send the request to one or more user computing devices 12. As shown in FIG. 3A, the server 14 may send out one or more requests to one or more user computing devices 12. In these embodiments, the system 10 operates with gig economy practices to have the requests fulfilled. In this gig economy practices, the system 10 may use individuals who are specific to the system 10 that engage with the system to receive compensation such as the user computing devices 12 depicted as "Brand Agents" (See FIGS. 3A-6, 9, 11 and 12) or the user computing devices 12 depicted as "Shoppers" (See FIG. 7), where every day shoppers may access the system and fulfill the request for a reward. As such, in these embodiments, the product placement verification request may be sent to one or more user computing device 12 that has accessed the system 10, such as through a product placement app or web app, and these product placement verification requests may be displayed on the user computing device 12 as a map with a store location associated with the product placement verification request. More than one request from one or more companies may be sent and all available requests to be fulfilled may be displayed on the map. A user may select a request to fulfill by selecting the store on the map. The user may then select to receive navigation to the store through use of the user computing device 12. Once at the store, the server 14 may be programmed to depict a store map as shown in FIG. 3B, thereby allowing the user to easily identify the end cap or end caps that he or she will be taking an image and/or video of. When ready the user computing device 12 may send an input that the user computing device 12 is ready to take the image and/or video.

Figure 4:
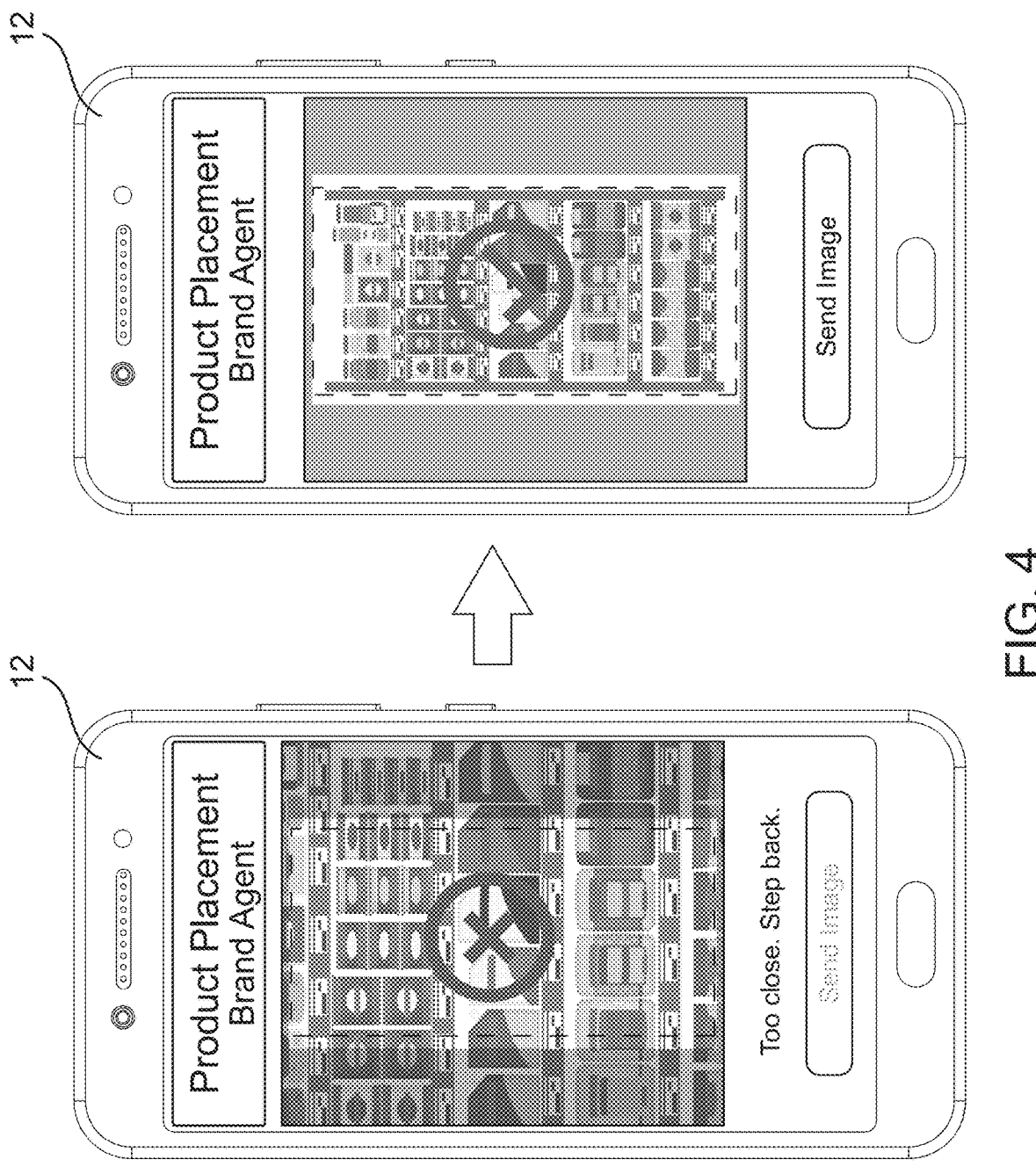
FIG. 4 is a user interface operating on a user computing device for interaction with a product placement verification system according to an embodiment.
Figure 5:
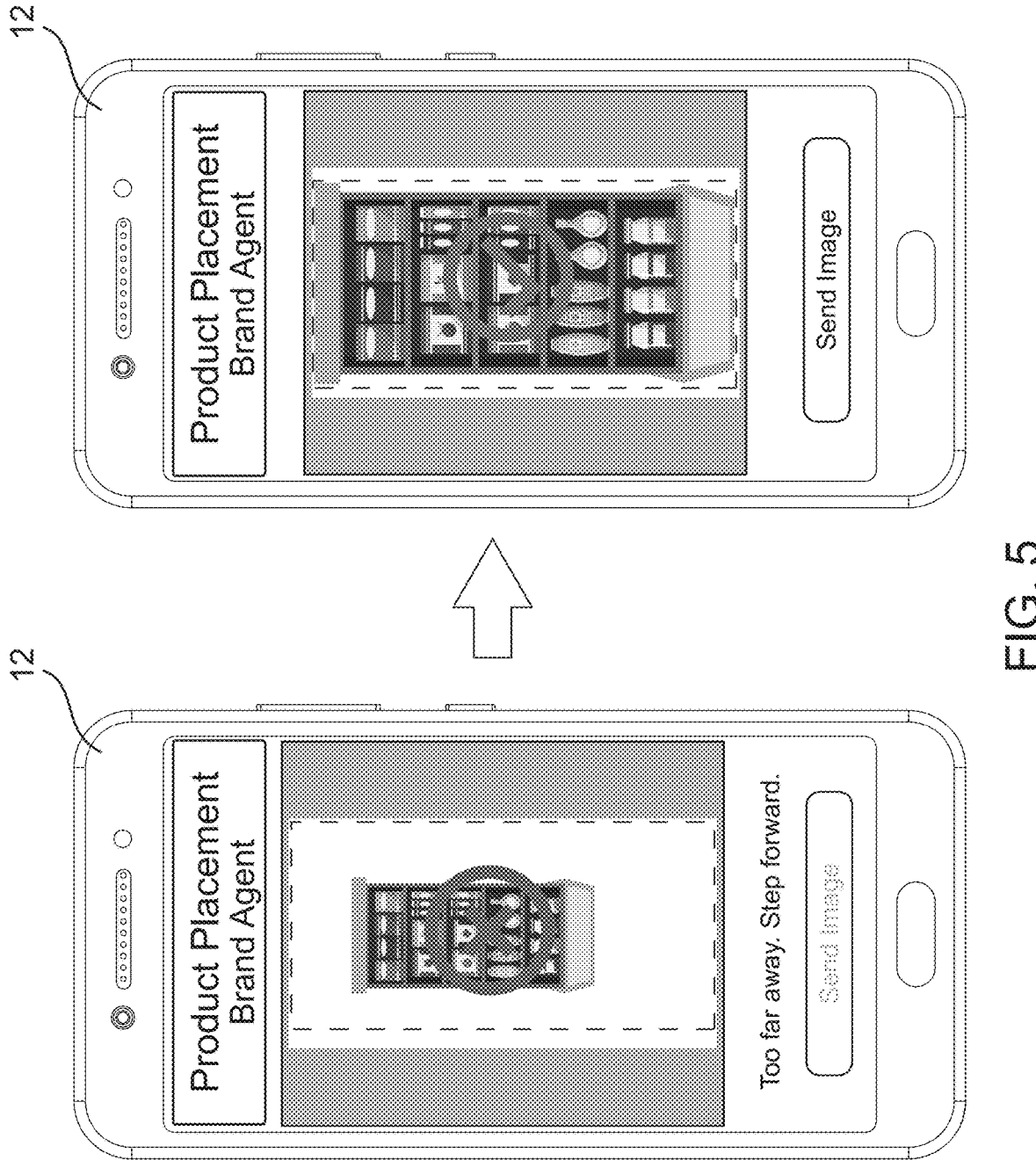
FIG. 5 is a user interface operating on a user computing device for interaction with a product placement verification system according to an embodiment.

The user computing device 12 may operate the product placement app that provides access to the camera of the user computing device 12. The user interface displayed on the user computing device 12 may include a screen with an indicator of where the end cap should be located in proximity to the camera order to take and send an image that is useable by the system 10, as shown in FIGS. 4 and 5. For example and without limitation, the user interface may include a clear portion to indicate what area the user should line up the end cap and also may include a dashed line rectangle that establishes a perimeter of what and image the end cap should be bound in for proper use within the system 10. The server and/or user computing device 12 may operate to give visual instruction and verification that the image being taken by the user computing device is accurate. It may give an indicator, such as a red X on the image indicating the camera is not the correct distance from the end cap or aisle as shown in FIGS. 4 and 5. Additionally, the user interface may display instructions for the user such as, "Too close. Step back." as shown in FIG. 4, or "Too far away. Step forward." as shown in FIG. 5. Once the camera of the user computing device is the proper distance from the end cap of aisle, with the end cap or portion of the aisle depicted within the dashed boundary line, the user computing device 12 may display a visual indicator that it is correct, such as a shown with the green check mark in FIGS. 4 and 5. The user computing device 12 may then send the image to the server 14.

Figure 6:
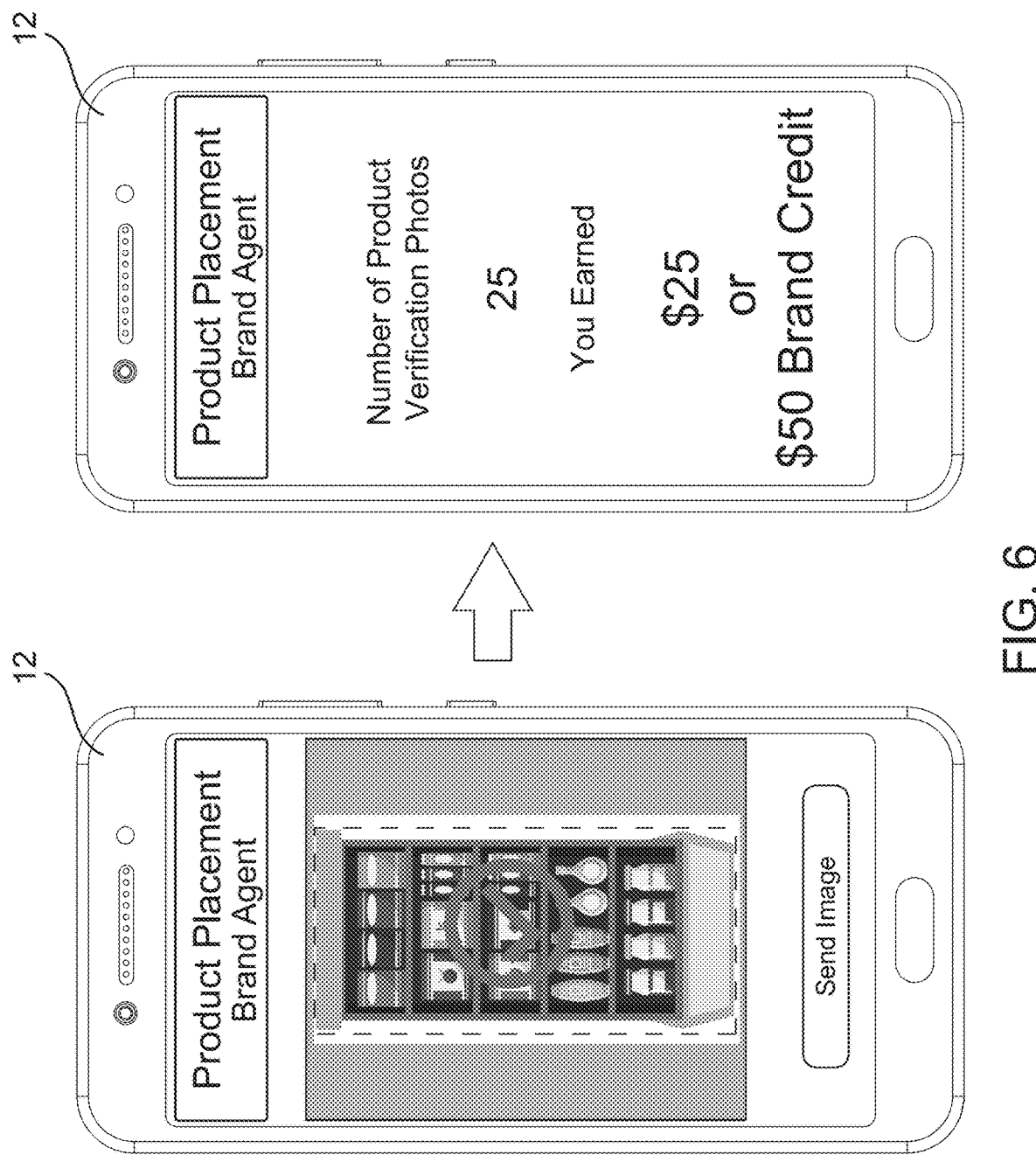
FIG. 6 is a user interface operating on a user computing device for interaction with a product placement verification system according to an embodiment.
Figure 7:
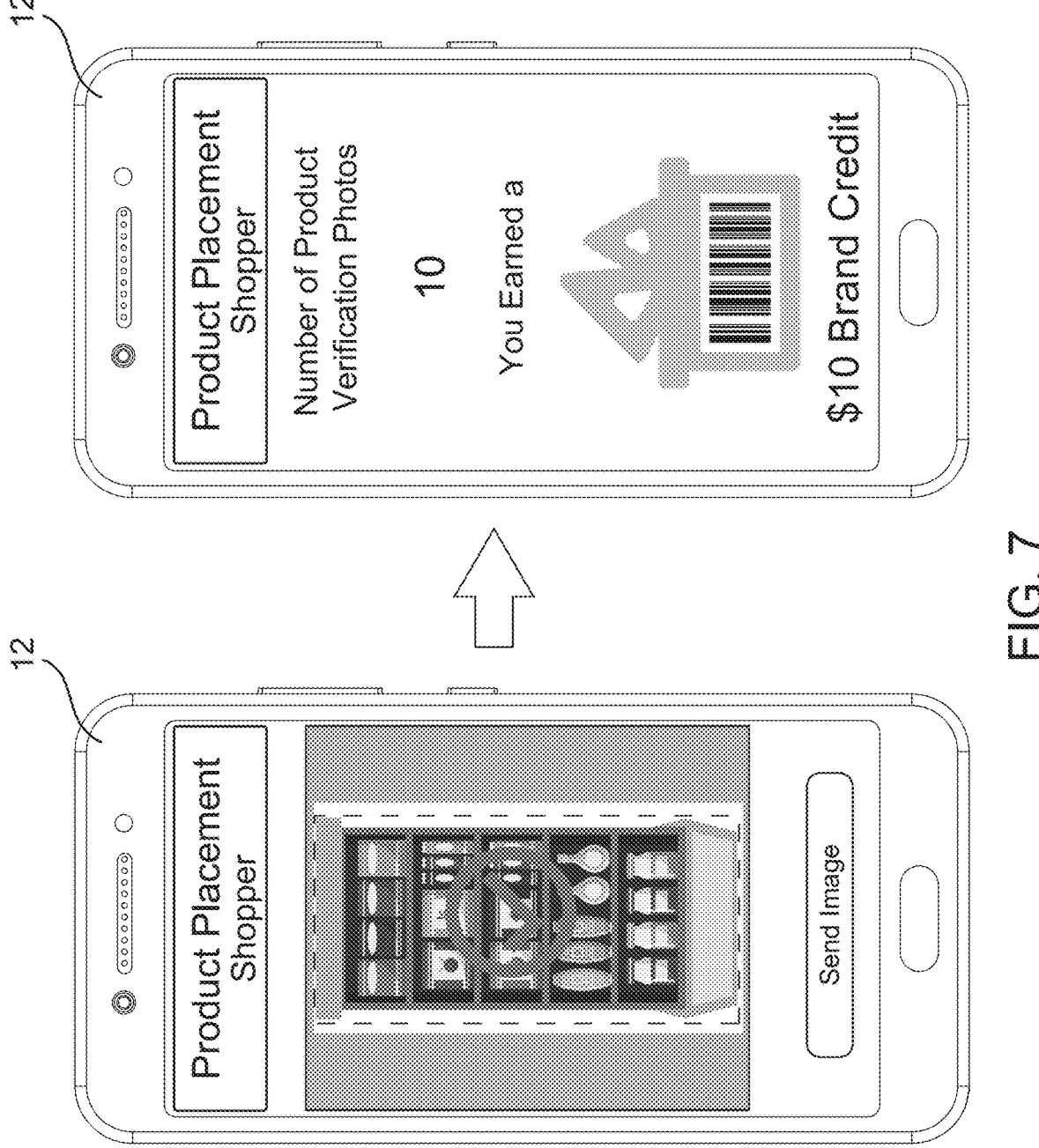
FIG. 7 is a user interface operating on a user computing device for interaction with a product placement verification system according to an embodiment.

The system 10 may operate to compensate individuals as part of the gig economy. As shown in FIG. 6, the sending of an image in response to a product placement request may result in payment. This may be after each image sent, or there may be payment made at certain numbers of images. For example and without limitation, the system 10 may determine to pay Brand Agents after 25 images sent, wherein the Brand Agent receives $1 for each image. The system 10 in some embodiments may give the companies producing product and requesting product placement verification to also offer brand credit. For example, as shown in FIG. 6 the user interface on the user computing device 12 may give the Brand Agent and opportunity to be paid or to receive brand credit. In some embodiments, the brand credit may be more than the dollar payment. Further, if the gig economy users are shoppers, as depicted in FIG. 7, the shoppers may earn a reward after a predetermined number of images taken. As shown in FIG. 7 and without limitation, the shopper may receive a $10 brand credit after taking 10 images using the system. The number images to be sent to earn brand credit and the amount of brand credit may be determined by the system or the entity operating the system for further by the company requesting product placement verification.

Figure 8:
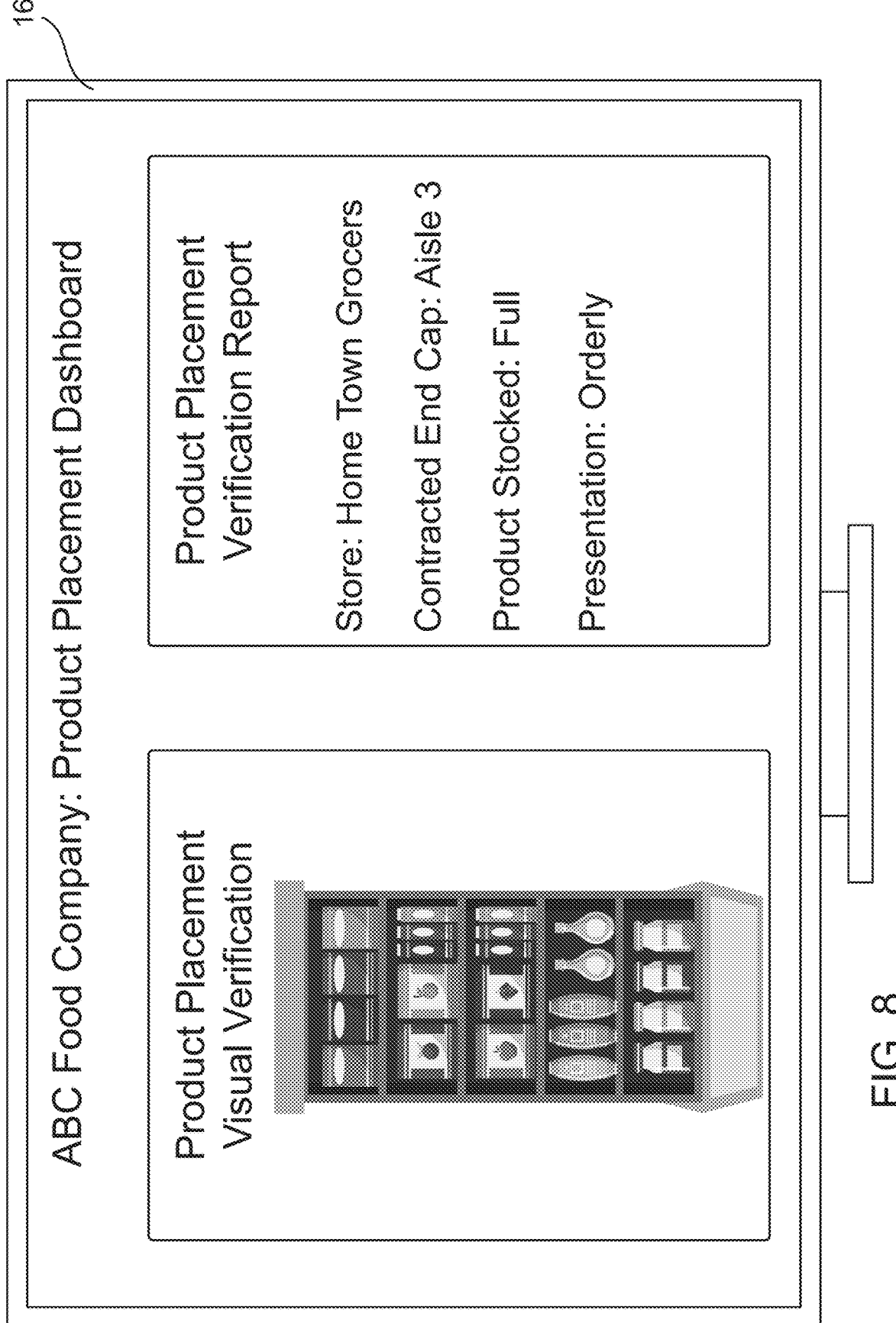
FIG. 8 is a front view of a business computing device operating as part of a product placement verification system receiving product placement reports and visual verification according to an embodiment.

Once the images are sent to the server 14 the server may generate a report accessible by the business computing device 16. As shown in FIG. 8, the user interface on the business computing device 16 may include a product placement visual verification image and/or video allowing the operator of the business computing device to visually inspect the image uploaded by the user computing device 12. Further, based on the image uploaded, the server 14 may be programmed to identify using image comparison artificial intelligent software to compare the products on the end cap or aisle shelves with images of the product stored in memory of the server 14 and generate a report. The report may be a Product Placement Verification Report as depicted in FIG. 8, wherein the report may include, without limitation, the store name, the contracted end caps between the company and the store, the stocked amount of product and the presentation of the product. This may be done automatically by the server 14 in accordance with programmed instructions.

Figure 9:
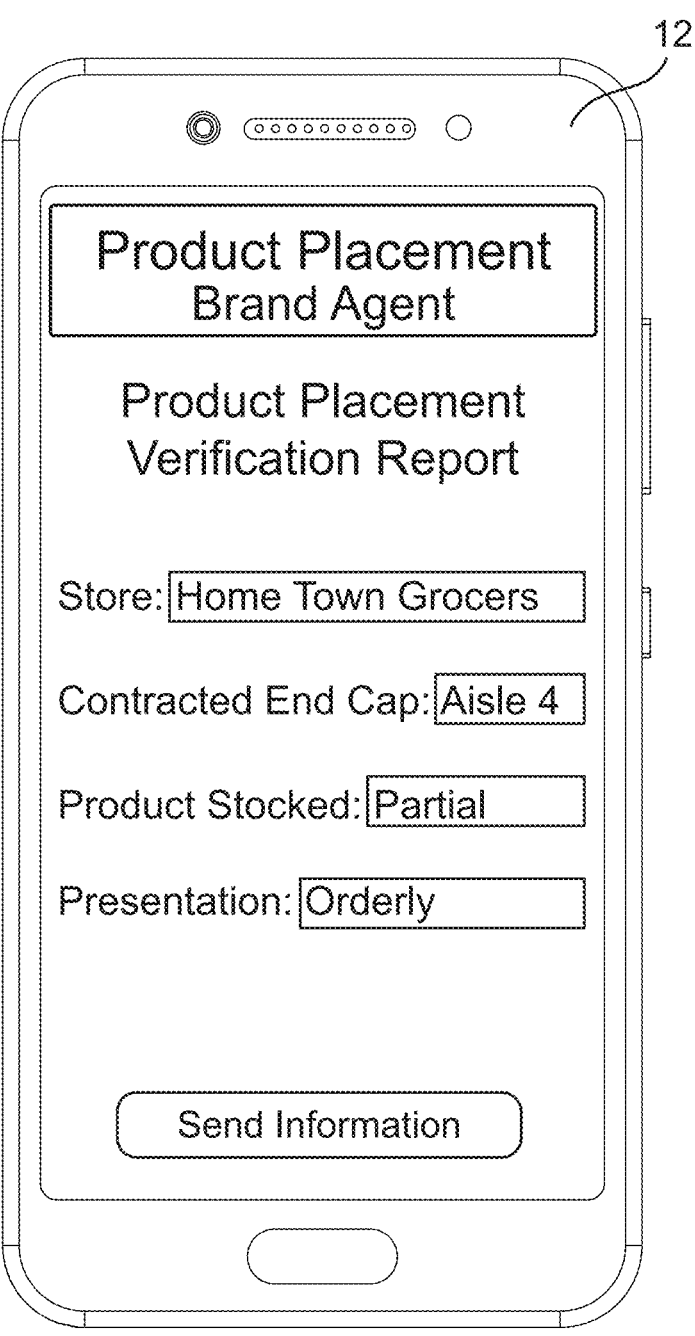
FIG. 9 is a user interface operating on a user computing device for interaction with a product placement verification system according to an embodiment.

It will be understood that in some embodiments, the system 10 may include a user interface on the user computing device 12 that allows for entry of information regarding the product placement verification request as shown in FIG. 9, wherein the user enters certain information in fields provided by the server 14. The user computing device 12 may then send the information to the server 14 and the server 14 may provide just a text report for display on the business computing device 16, such as just displaying the Product Placement Verification Report portion of FIG. 8.

Figure 10:
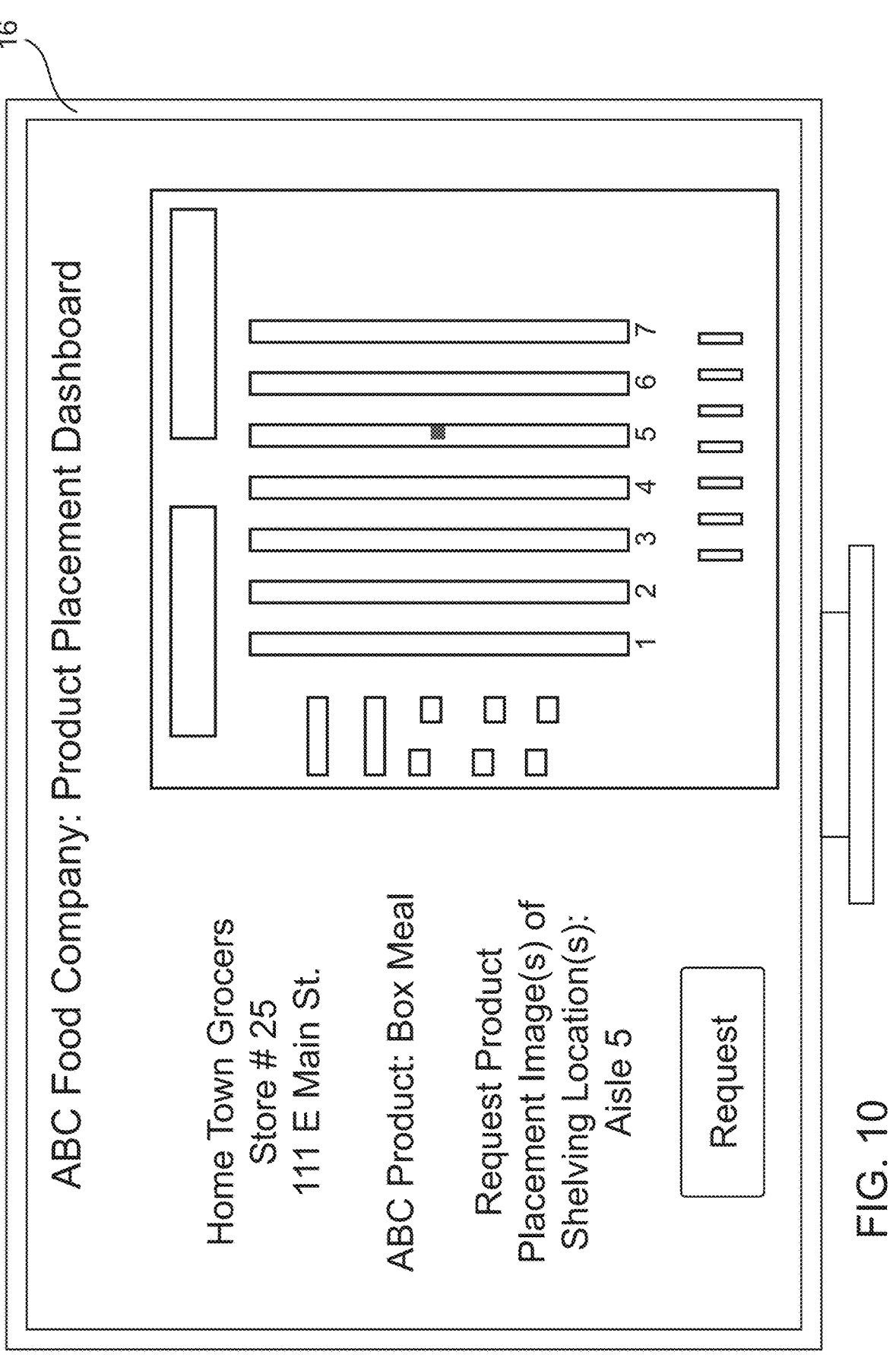
FIG. 10 is a front view of a business computing device operating as part of a product placement verification system for requesting product placement verification according to an embodiment.

While FIGS. 2-9 depict use of the system 10 with respect to end caps of aisles, the system 10 may operate for verification of product placement within aisles. As shown in FIG. 10, the business computing device 16 may provide a user interface for requesting product placement verification. In this embodiment, the business computing device 16 may include a request for verifying a product or product on and aisle or aisles. The request may include the store name, the address, and the aisle and product location that the company wishes to have product placement verification performed. In embodiments, the server 14 may send for display on the business computing device 16 a map in a graphical interface allowing the operator of the business computing device 16 to interact with the map and select the end caps that the company wishes to analyze or verify, as depicted by the red indicator on the map. In embodiments, the business computing device 16 may receive text input and the server 14 may operate to display the text input in a graphical form in the map, such as entry of aisle and product location and the map then depicts the location with an indicator, such as the red indicator shown in FIG. 10. Once the company operating the business computing device 16 is satisfied with the request content, the operator may select the request button to send the request to the server 14.

Once the server 14 receives the request from the business computing device 16, the server 14 may be programmed to process the request and generate a product placement verification request that includes the content and information in the request from the business computing device 16. The server 14 may be programmed to send the request to one or more user computing devices 12. The user may then use user computing device in a manner as described above with respect to FIGS. 3A and 3B to select a request, navigate to the corresponding store, and then navigate to the aisle and product locations.

Figure 11:
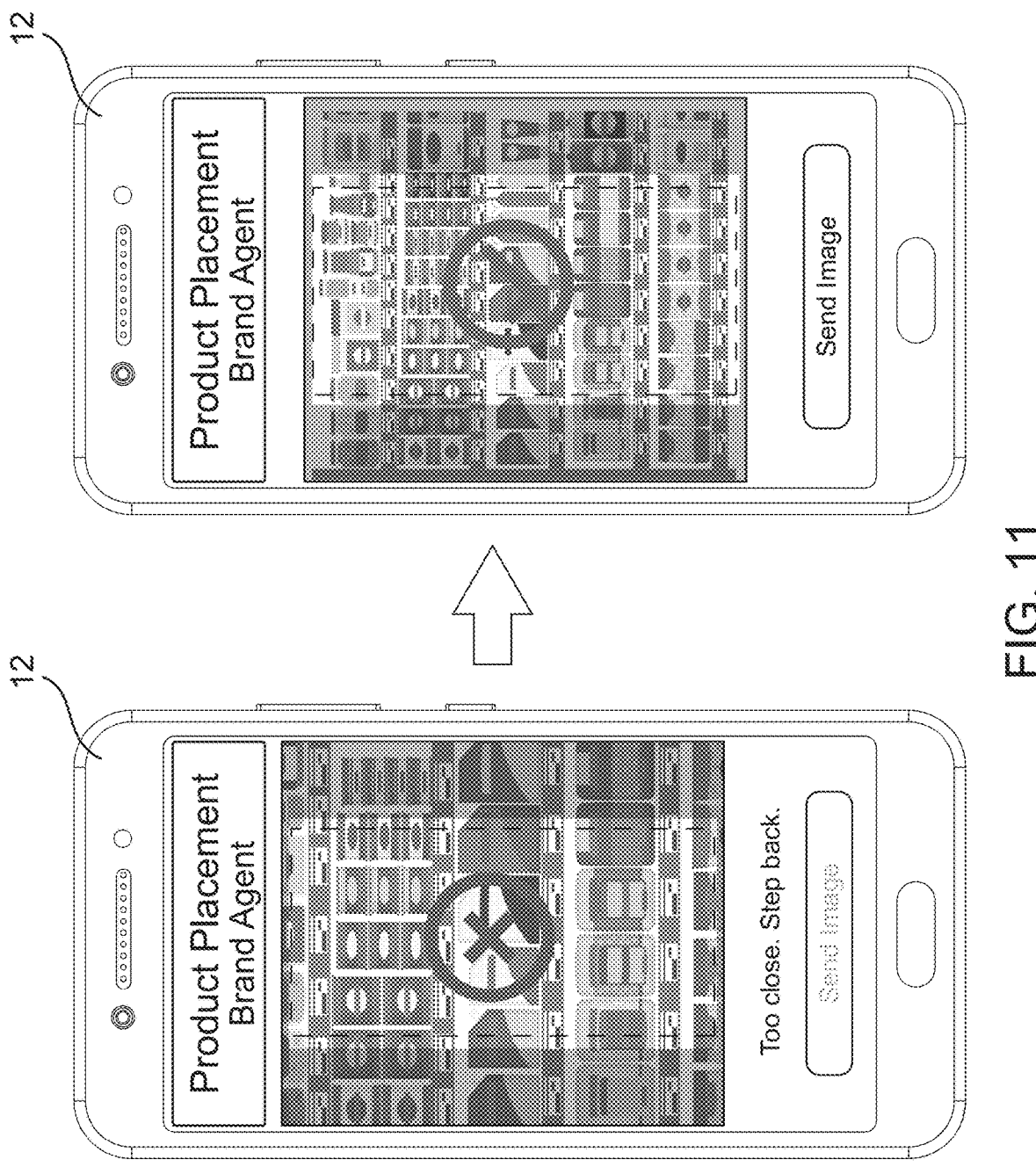
FIG. 11 is a user interface operating on a user computing device for interaction with a product placement verification system according to an embodiment.

Once as the aisle and product location, the user computing device 12 may operate the product placement app that provides access to the camera of the user computing device 12. The user interface displayed on the user computing device 12 may include a screen with an indicator of where the portion of the shelves of the aisle should be located in proximity to the camera order to take and send an image that is useable by the system 10, as shown in FIG. 11. For example and without limitation, the user interface may include a clear portion to indicate what area the user should line up the shelves of the aisle and also may include a dashed line rectangle that establishes a perimeter of what and image the portion of the aisle should be bound in for proper use within the system 10. The server and/or user computing device 12 may operate to give visual instruction and verification that the image being taken by the user computing device is accurate. It may give an indicator, such as a red X on the image indicating the camera is not the correct distance from the aisle as shown in FIGS. 11 and 5. Additionally, the user interface may display instructions for the user such as, "Too close. Step back." as shown in FIG. 11, or "Too far away. Step forward." as shown in FIG. 5. Once the camera of the user computing device is the proper distance from the product location on the aisle, with the portion of the aisle depicted within the dashed boundary line, the user computing device 12 may display a visual indicator that it is correct, such as a shown with the green check mark in FIG. 11. The user computing device 12 may then send the image to the server 14. The users operating the user computing device may be compensated as described above.

It will be understood that in some embodiments, the system 10 may include a user interface on the user computing device 12 that allows for entry of information regarding the product placement verification request as shown in FIG. 12, wherein the user enters certain information in fields provided by the server 14. The user computing device 12 may then send the information to the server 14 and the server 14 may provide just a text report for display on the business computing device 16, such as just displaying the Product Placement Verification Report portion of FIG. 13.

Figure 13:
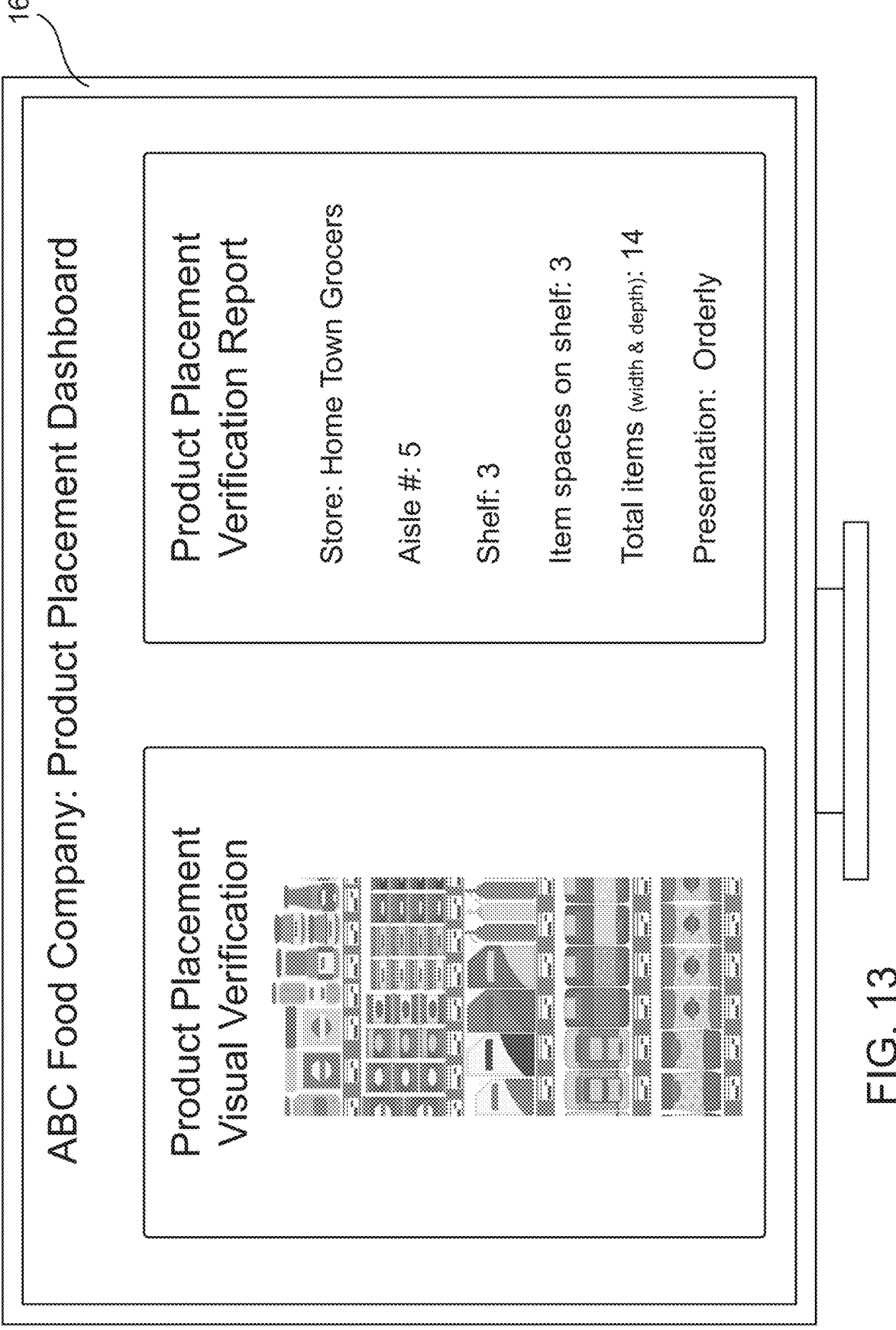
FIG. 13 is a front view of a business computing device operating as part of a product placement verification system receiving product placement reports and visual verification according to an embodiment.

Once the images are sent to the server 14 the server may generate a report accessible by the business computing device 16. As shown in FIG. 13, the user interface on the business computing device 16 may include a product placement visual verification image and/or video allowing the operator of the business computing device to visually inspect the image uploaded by the user computing device 12. Further, based on the image uploaded and/or input from the user computing device 12, the server 14 may be programmed to identify using image comparison artificial intelligent software to compare the products on the end cap or aisle shelves with images of the product stored in memory of the server 14 and generate a report. The report may be a Product Placement Verification Report as depicted in FIG. 13, wherein the report may include, without limitation, the store name, aisle number, shelf, item spaces on the shelf, total items including along width of shelf and depth of shelf, and the presentation of the product. This may be done automatically by the server 14 in accordance with programmed instructions.

Figure 14:
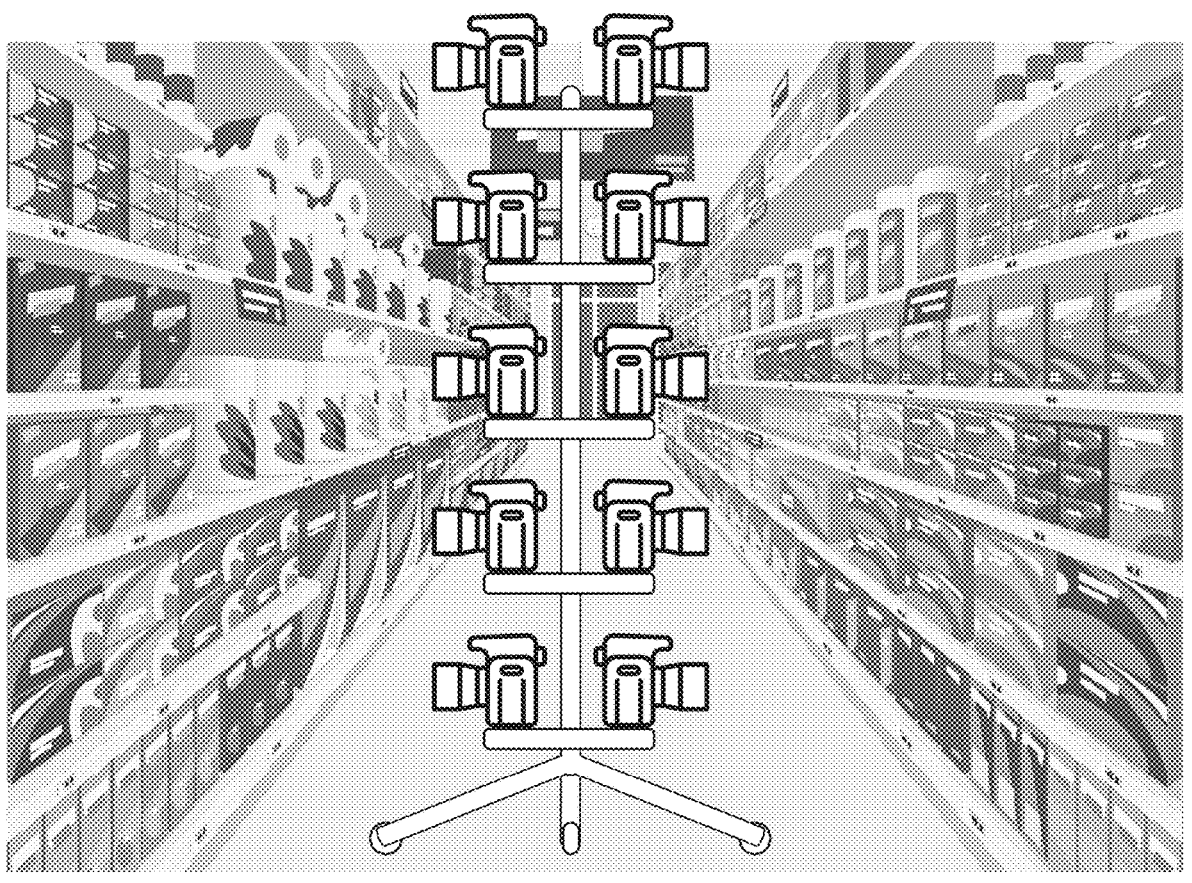
FIG. 14 is a perspective view of a camera system operating as part of a product placement verification system according to an embodiment.

Another embodiment of the system 10 is depicted in FIGS. 14-17. The server 14 may include a memory storing store information and product information. The store information may include at least one shelving video or photography of travel up and down aisles of a store recorded by a camera system as depicted in FIG. 14. For example, the camera system may be a mobile system, such as a cart that can hold one or more cameras. The cart may be navigated up and down aisles. In systems with more than one camera, the cameras may be mounted to the mobile cart in a way that places each camera at shelf levels to better record each shelf of each aisle. In embodiments, the server 14 may store shelving videos or photography of travel for a plurality of stores. Further, in some embodiments, store maps may be supplied to the server 14, wherein the shelving videos or photography may be associated with the store maps in order to identify what SKUs are located on what rows, thereby aligning shelving videos or photography of stores with corresponding store maps. The system 10 may also identify, from the shelving video or photography, what SKUs are located on what shelf by identifying the SKUs from the shelf tags. The server 14 may be programmed to make a selectable link for each shelf tag to allow a customer engaged in remote product placement services from a remote location to select items for performing product placement analysis.

Additionally, while the system 10 has been described as corresponding the images from the camera system with an existing map, it will be understood that the system 10 may include the server 14 programmed to create a map that may be three-dimensional or a virtual reality map. It further creates a map and images that locate all of the products within the store more accurately including shelf height and location on aisles. This map may be utilized by the system or may be utilized by other systems as an operating digital map of the store or various stores.

A user computing device 12 may be coupled to the server 14, and the server 14 may be programmed to receive and process a signal from the camera system containing the recorded shelving video or photography and store the shelving video or photography in the memory of the server; receive and process a signal from the user computing device that the user computing device has accessed the system and requested product placement services; send, for display on the user computing device, a product placement interface including the shelving video or photography with navigation controls; receive navigation input from the navigation controls on the shopping interface displayed on the user computing device and adjust the display in response to the input from the navigation controls; receive an item selection input from the user computing device to view a location of each selected item on a shelf within the store; send, for display on the user computing device, the product placement interface including shelf height information and slot width measurements for visual verification of the product placement purchased by the user; receive a signal from the user computing device including a report request; and send, for display on the user computing device, a report interface including product placement data.

Figure 15:
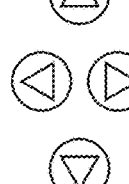
FIG. 15 is a front view of a business computing device operating as part of a product placement verification system for interaction with a product placement verification system according to an embodiment.
Figure 16:
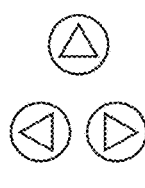
FIG. 16 is a front view of a business computing device operating as part of a product placement verification system for interaction with a product placement verification system according to an embodiment.
Figure 16:
Figure 16:

Referring to FIGS. 15-16, the system 10 may then allow a user to access the system through the user computing device 12 to engage in remote product placement analysis from a store. The user, such as a company employee may utilize the user computing device 12 to access the system and the server 14 may be programmed to send for display a user interface that displays the stored shelving video or photography images associated with the store the customer has selected for analyzing. The user interface may include navigation controls that allow the customer to navigate up and down aisles, view products on shelves and zoom for a better view of the product and the like, as shown in FIGS. 15-16. The customer may use the navigation control to face a particular section of shelving in a store as depicted in FIG. 15. If desired, the customer may then zoom in for a closer view, using the zoom control as depicted in FIG. 16. The customer may select an item to analyze. Referring to FIGS. 15-16, when selection of an item is executed by the customer using the user computing device 12, the server 14 may receive a signal that includes item selection input from the user computing device and automatically send for display on the user computing device 12 shelf height information and slot width as depicted in FIGS. 15-16. This can be utilized for visual verification of the proper product placement, including shelf height and slot width.

Figure 17:
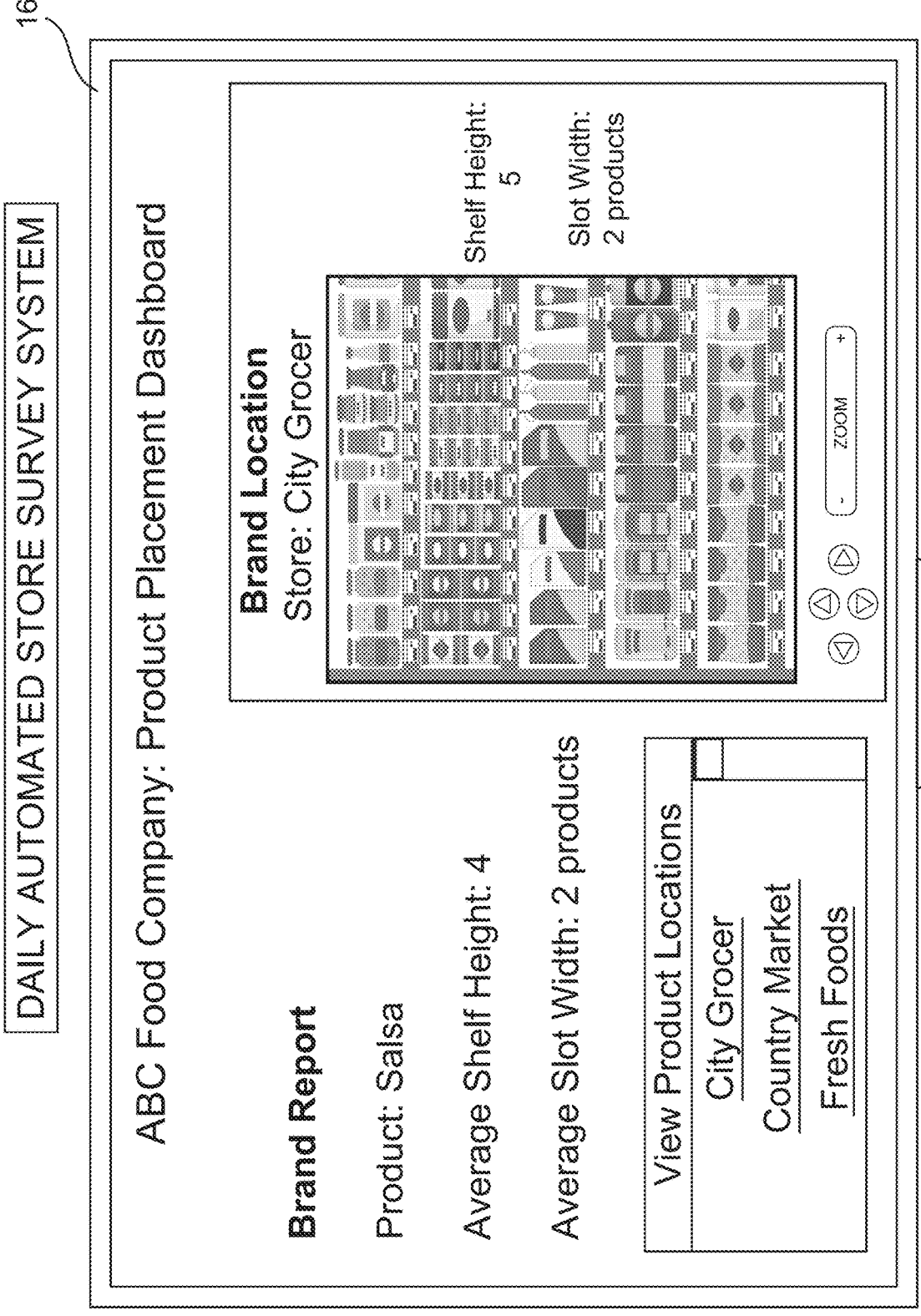
FIG. 17 is a front view of a business computing device operating as part of a product placement verification system showing a brand report according to an embodiment.

Additionally, the system 10 may include a brand report element as depicted in FIG. 17. In such embodiments, the company that produces products sold in a store may obtain a report of a particular product and brand sold in all stores. The report may provide average shelf height along with average product spaces allocated by stores for the product on the shelves. The system may also provide those details for specific stores and allow visual inspection of the product placement on each store as part of the brand report. This allows the company to determine how product placement affects sales from store to store.

The server 14 may be programmed to communicate with a store server to obtain sales information of the product/item that is being analyzed. The user may request a report and the server may generate and send for display on the user computing device 12. The report may include certain product placement information, such as, but not limited to, shelf height, slot width, average weekly sales, and a value of the slot. The allows the user/company to determine if the value being received from that product placement is consistent with the cost of said product placement. This allows the user to verify proper product placement and receive information to determine if the product placement is providing the value consistent with the cost, thereby providing the information necessary to make business decisions Embodiments may further include the following features: a camera system may survey each aisle at predetermined time intervals, such as every hour, every six hours, every day, once a week, once a month, once a year and so forth to ensure the video or photography of the aisles will be current, showing the actual products; the system may be utilized with custom stores that are set up to never have customers in the store, but just for this display system like a virtual grocery store; the system is scalable for a small number of SKUs to a large number of SKUs; the system can highlight what a customer bought last time on the video trail; and the like.

Figure 18:
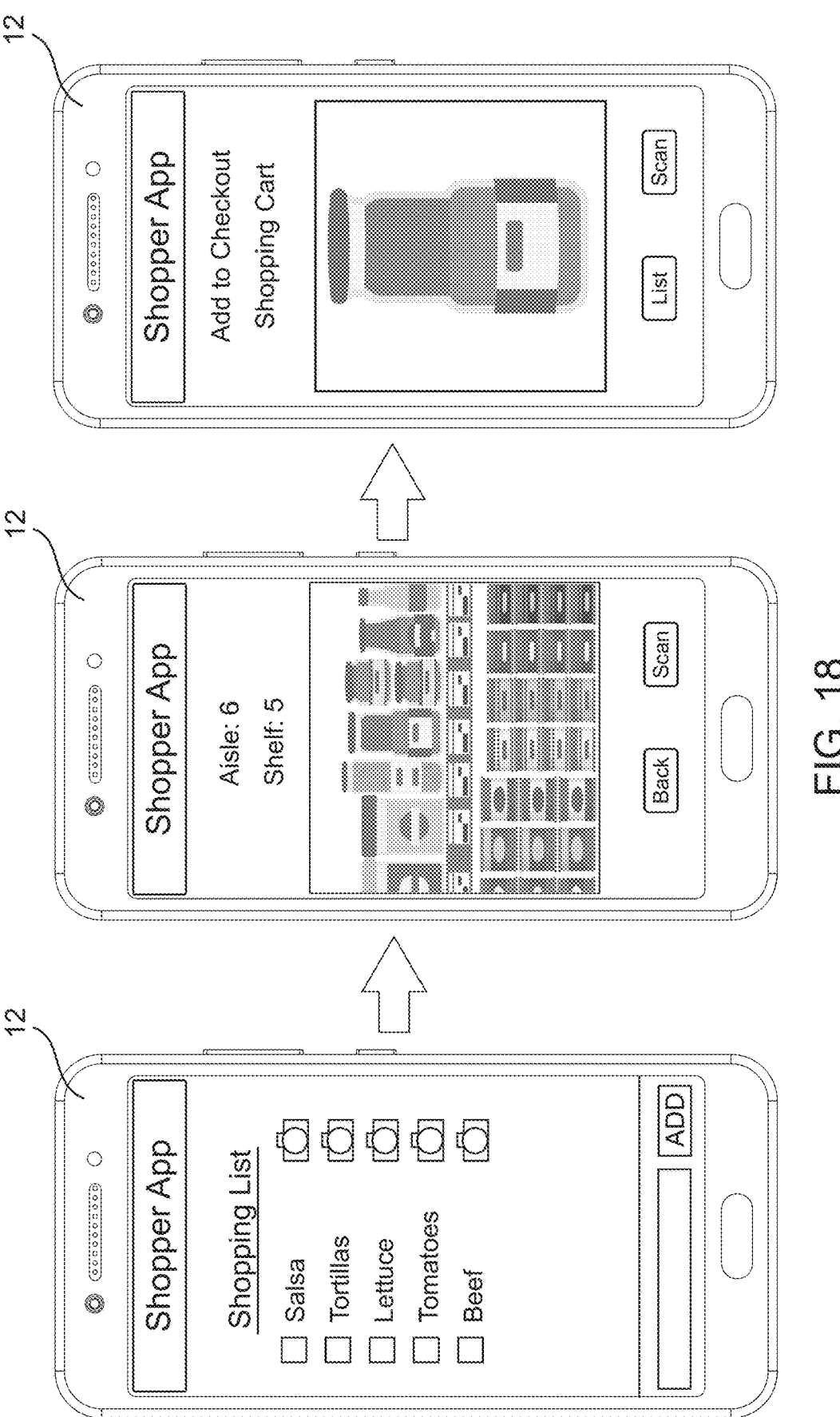
FIG. 18 is a front view of a user computing device operating to provide shopping assistance by using the system according to an embodiment.

Referring further to FIG. 18, the system may include a shopping app operating as part of the system 10. The user computing device operating the shopping app may provide a shopping list input. The shopping list input may automatically include images associated with each item in the list, wherein the image may be viewed by selecting an icon to direct the user computing device 12 to an image of the product along with an aisle and shelf location. The image may be utilized to direct the shopper to know exactly what the product looks like. In order to do so, the user may enter the store he or she is heading to, or the system may utilize the location of the user computing device 12 through GPS or the like to determine what store the user computing device 12 is located and automatically associate the correct image with the items in the list. While the list is shown with generic names for goods, in some embodiments, the list may require a specific product for the goods. The system 10 may also allow for scanning of the products to place ins a digital shopping cart and allow the user to check out without using a checkout lane of the store. This may be used in correlation with means to ensure that the users are not stealing products.

Embodiments may be available on or through the internet, such as through domain names reserved and owned by Applicant that include aislesurvey.com, 3daisle.com, aislebrain.com, upmyaisle.com, brand-survey.com, 3dgroceries-.com, headersurvey.com, headerdata.com, ailsesnap.com, ailsemap.com, aisle2ailse.com, aislerace.com, whereareyou-dhiding.com, storemaper.com and the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A product placement verification system comprising:
a server having a memory for storing store information and product information;
a user computing device coupled to the server, the user computing device operating an application to access the system; and
a business computing device coupled to the server, wherein the server is programmed to:
receive and process a signal from the business computing device including a request for a product placement verification at a particular store;
generate and send a product placement verification request to the user computing device including information received from the request received from the business computing device and display on the user computing device as a map with a location indicated on the map for the particular store;
receive and process a signal from the user computing device including acceptance of the product placement verification request in response to selecting the particular store on the map displayed on the user computing device;
receive a signal from the user computing device that the user computing device is within the store corresponding to the product placement verification request using GPS location of the user computing device and that the user computing device is operating the application for taking and sending an image and/or video of a location of a product corresponding to the product placement verification request, wherein the application operated by the user computing device comprises instruction to operate a camera of the user computing device and displays on a user interface an indicator of where the product should be located in proximity of the camera of the user computing device, wherein the indicator comprises a lined rectangle that establishes a perimeter of what an image the product should be bound in for proper use within the system, with the image of the of the product displayed on the user computing device as being captured by the camera;

automatically determine by analyzing the camera feed in real-time to ensure the captured image meets predetermined quality parameters for AI-based SKU identification whether the camera of the user computing device is a proper distance from the product for proper use within the system and display a visual notification on the user interface of the determination; and in response to an incorrect indication of proper distance, display instruction on the user computing device how to place the camera at the proper distance;

receive a signal from the user computing device including the image and/or video of the location of the product and store the image and/or video in the memory of the server;

process the image and/or video using image comparison artificial intelligence software to automatically identify, from the image and/or video of the location of the product, what SKUs are located on what shelf by identifying the SKUs from the shelf tags and generate the report without human intervention; and send for display on the business computing device the image and/or video of the location of the product and the report corresponding to the product within the store corresponding to the product placement verification request.

2. The system of claim 1, wherein the server is further programmed to send for display on the user computing device navigation instruction to the store.

3. The system of claim 1, wherein the location of the product corresponding to the product placement verification request is an end cap or header.

4. The system of claim 1, wherein the location of the product corresponding to the product placement verification request is a location in an aisle.

* * * * *